(12) United States Patent
Luo et al.

(10) Patent No.: US 9,215,479 B2
(45) Date of Patent: Dec. 15, 2015

(54) SYSTEM AND METHOD FOR REAL-TIME NEW EVENT DETECTION ON VIDEO STREAMS

(71) Applicant: International Business Machines Corporation, Armonk, NY (US)

(72) Inventors: Gang Luo, Yorktown Heights, NY (US); Rong Yan, Elmsford, NY (US); Philip Shi-Lung Yu, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 384 days.

(21) Appl. No.: 13/759,638

(22) Filed: Feb. 5, 2013

(65) Prior Publication Data

US 2014/0344845 A1    Nov. 20, 2014

Related U.S. Application Data

(62) Division of application No. 11/933,775, filed on Nov. 1, 2007, now Pat. No. 8,428,360.

(51) Int. Cl.
| | |
|---|---|
| *G06K 9/66* | (2006.01) |
| *G06K 9/62* | (2006.01) |
| *H04N 21/234* | (2011.01) |
| *G06K 9/00* | (2006.01) |

(Continued)

(52) U.S. Cl.
CPC ...... *H04N 21/23418* (2013.01); *G06K 9/00765* (2013.01); *H04N 21/44008* (2013.01); *H04N 21/4542* (2013.01); *H04N 21/45452* (2013.01)

(58) Field of Classification Search
USPC ..................................... 382/190, 224; 725/19
See application file for complete search history.

(56) References Cited

U.S. PATENT DOCUMENTS

| | | | |
|---|---|---|---|
| 6,744,922 B1 | 6/2004 | Walker | |
| 7,773,809 B2 * | 8/2010 | Lee et al. | 382/190 |
| 2003/0187642 A1 * | 10/2003 | Ponceleon et al. | 704/252 |

FOREIGN PATENT DOCUMENTS

| | | |
|---|---|---|
| JP | 09270006 A | 10/1997 |
| JP | 2005080169 A | 3/2005 |
| WO | 2007029489 A1 | 3/2007 |

OTHER PUBLICATIONS

Allan et al., On-line New Event Detection and Tracking, Proceedings of the 21$^{st}$ ACM-SIGIR International Conference on Research and Development in Information Retrieval, Aug. 1998, pp. 1-9.*

(Continued)

*Primary Examiner* — John Strege
(74) *Attorney, Agent, or Firm* — Jeff Tang; Ryan, Mason & Lewis, LLP

(57) ABSTRACT

Techniques are disclosed for detecting new events in a video stream that yield improved detection efficiency in real time. For example, a method determines whether a given event is a new event in a video stream. The video stream includes a plurality of events. A first step extracts a first set of features (e.g., text features) from the given event. The first set of features is computationally less expensive to process as compared to a second set of features (e.g., image features) associated with the given event. A second step computes one or more first dissimilarity values between the given event and one or more previous events in the video stream using only the first set of features when one or more first dissimilarity criteria exist. A third step determines whether the given event is a new event based on the one or more computed first dissimilarity values.

17 Claims, 5 Drawing Sheets

(51) Int. Cl.
  *H04N 21/44*    (2011.01)
  *H04N 21/454*   (2011.01)
  *H04N 21/4545*  (2011.01)

(56) References Cited

OTHER PUBLICATIONS

R.K. Braun et al., "Exploiting Topic Pragmatics for New Event Detection in TDT-2004," TDT Workshop, 2004, 8 pages, California.

M. Campbell et al., "IBM Research TRECVID-2006 Video Retrieval System," NIST TRECVID Workshop, 2006, pp. 1-20, New York.

W.H. Hsu et al., "Topic Tracking Across Broadcast News Videos with Visual Duplicates and Semantic Concepts," IEEE International Conference on Image Processing (ICIP), 2006, 4 pages, New York.

G. Luo et al., "Resource-Adaptive Real-Time New Event Detection," SIGMOD, 2007, 12 pages, China.

R. Peterson, "IBM Strives for Super Human Speech," http://www.accessible-devices.com/superspeech.html, 2006, pp. 1-3.

* cited by examiner

```
Image_feature_extraction_flag=FALSE;/* whether image features have been extracted
for the new shot S */
First_story_shot_flag=TRUE;//..whether S is a new-event shot
Use pre-filtering and index building steps (see specification) to identify the old
shots that need to be compared with S. For each such old shot S_old {
    Compute text_dotprod_{S, S_old};

If(1-T ≥ text_dotprod_{S, S_old})  /* Case 1 */
        Predict that S and S_old present different events;
    Else if(1+w_{image}-T < text_dotprod_{S, S_old}) {// Case 3
        Predict that S and S_old present the same event;
        First_story_shot_flag=FALSE;
        Exit the for loop;
    }
    Else if(1-T < text_dotprod_{S, S_old} ≤ 1+w_{image}-T) {// Case 2
        If(!Image_feature_extraction_flag){
            Extract image features for S;
            Determine whether S is an anchor shot;
            Image_feature_extraction_flag=TRUE;
        }
        if ((S is an anchor shot) || (S_old is an anchor shot))
            image_dissim_{S, S_old} = T_{image} + 1; /* treat the keyframes of S and S_old to
            be dissimilar */
        Else compute image_dissim_{S, S_old};

If (image_dissim_{S, S_old} ≤ T_{image})  { /* Sub-case 1 */

Predict that S and S_old present the same event;
            First_story_shot_flag=FALSE;
            Exit the for loop;
        }
        Else If (image_dissim_{S, S_old} > T_{image})  /* Sub-case 2 */
            Predict that S and S_old present different events;
    } /* end of Case 2 */
} /* end of the for loop */
If (First_story_shot_flag) {
    If (!Image_feature_extraction_flag) {
        Extract image features for S;
        Determine whether S is an anchor shot;
    }
    Save S's information in memory;
    Send S to the consumer of the ONED system;
}
```

600

610

700

SYSTEM AND METHOD FOR REAL-TIME NEW EVENT DETECTION ON VIDEO STREAMS

CROSS REFERENCE TO RELATED APPLICATION

The present application is a divisional of U.S. patent application Ser. No. 11/933,775, filed on Nov. 1, 2007, the disclosure of which is incorporated by reference herein in its entirety.

STATEMENT REGARDING FEDERALLY SPONSORED RESEARCH OR DEVELOPMENT

This invention was made with Government support under Contract No.: H98230-07-C-0383 awarded by the Department of Defense. The Government has certain rights in this invention.

FIELD

The present application generally relates to video stream processing and more particularly to techniques for detecting new events in a video stream.

BACKGROUND

For streaming video, new event detection (NED) is the task of capturing the first video clips that present previously unseen events. This task has practical applications in a number of domains such as intelligence gathering (e.g., for anti-terrorism purposes), financial market analyses, and news analyses, where useful information is typically buried in a large amount of data that grows rapidly with time. Since these applications are often time-critical and require fast turn-around, it is highly desirable to develop an online new event detection (ONED) system in practice.

About a decade ago, ONED on document streams started to gain more and more interest in the text processing community. As an extension of its text counterpart, ONED on video streams has also attracted a growing attention in the video processing community by leveraging both text and visual information. The basic idea of video ONED systems is to compare a new clip with all the clips that arrived in the past. If their similarity values based on text and visual features are all below a certain threshold, the new clip will be predicted as presenting a new event.

Previous work has shown that additional image information plays an important role in identifying the relevant video clips and achieving better topic tracking results. However, all these efforts on video ONED mainly focus on optimizing the detection accuracy instead of the detection efficiency. Actually, these methods yield a quadratic time complexity with respect to the number of clips. Thus, they are not efficient enough to detect new video events in a real-time environment, especially for large-scale video collections.

For example, in the intelligence gathering system in which tens of thousands of television channels are required to be monitored simultaneously, it is very difficult for existing ONED systems to handle such an aggregated and extremely high-bandwidth video stream in real time. Thus, while some existing NED systems are referred to as being usable online, they are really not efficient enough for real-time applications.

SUMMARY

Embodiments of the invention provide techniques for detecting new events in a video stream that yield improved detection efficiency in real time.

For example, in one embodiment of the invention, a method determines whether a given event is a new event in a video stream. The video stream includes a plurality of events. A first step extracts a first set of features (e.g., text features) from the given event. The first set of features is computationally less expensive to process as compared to a second set of features (e.g., image features) associated with the given event. A second step computes one or more first dissimilarity values between the given event and one or more previous events in the video stream using only the first set of features when one or more first dissimilarity criteria exist. A third step determines whether the given event is a new event based on the one or more computed first dissimilarity values.

In another embodiment of the invention, a real-time new event detection method for capturing new-event video clips that present previously unseen events in a video streaming environment includes a multi-stage sequential filtering process. The process includes identifying relevant features, ranking the features based on computational effort to derive or extract the features, and forming one or more multi-stage sequential filters based on the ranked features, where the more easily computed features are used before less easily computed features. In one particular embodiment, one stage of the multi-stage sequential filtering process is the use of text features alone as a filter to detect a new event, while a subsequent stage is the use of image features as a filter to supplement the detection process.

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 5 illustrates an online new event detection methodology, according to an embodiment of the invention.

DETAILED DESCRIPTION OF PREFERRED EMBODIMENTS

Embodiments of the present invention will be explained below in the context of illustrative types of video stream-based data. However, it is to be understood that embodiments of the present invention is not limited to any particular type of video data stream. Rather, embodiments of the invention are more generally applicable to any video data stream in which it would be desirable to improve detection efficiency of new events in the video data stream.

Figure 1:
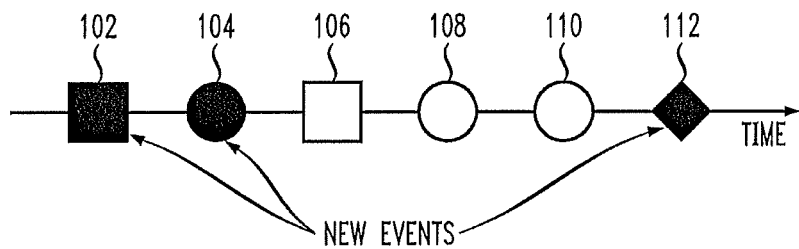
FIG. 1 illustrates events in a video data stream, according to an embodiment of the invention.

FIG. 1 depicts events (102, 104, 106, 108, 110 and 112) in a video stream along a time axis. Different shapes correspond to different events. Filled shapes represent the clips (i.e., new clips) that need to be captured. It is to be understood that the phrase "video clip" (or more simply "clip") is intended to refer to at least one portion of a video stream and the term "event" corresponds to the occurrence or presence of the subject clip in the video data stream. It is also to be understood that the "clip" (or more generally the subject portion of the video stream) can comprise one or more images. As will be explained further below, a "clip" may also be a "shot." Also, it is to be understood that the term "online" may be used interchangeably with the term "real-time" and generally describe steps/operations being performed substantially contemporaneous with the receipt of a new event or clip in the video stream. Compare this to "offline" or "non-real-time" processing, where steps/operations are performed at some time later.

In accordance with principles of the invention, techniques are provided to address the aforementioned efficiency problem and improve the video processing rate of an ONED system by orders of magnitude without sacrificing substantial detection accuracy. Since the computation on image features is rather time-consuming, we maximize the efficiency of our ONED system by delaying the processing of image features as much as possible. More specifically, we propose the following several optimization steps. First, we use text features alone to filter out most of the non-new-event clips, so that the expensive image feature extraction step of these clips is waived. Then, when comparing the new clip with an old clip, we first compute their text similarity and skip the costly image similarity computation if their texts are sufficiently dissimilar. Finally, we use a combination of indexing and compression methods to speed up text processing. During image similarity computation, we also remove the anchor images to improve the detection accuracy of the ONED system.

Before discussing the optimized techniques in detail, we first describe one illustrative embodiment of an ONED system (referred to herein as the "baseline system"). It is assumed that this baseline system combines the two most influential information sources suggested in the state-of-the-art ONED system reported in Hsu and Chang (W. Hsu, and S. Chang, "Topic Tracking across Broadcast News Videos with Visual Duplicates and Semantic Concepts," IEEE International Conference on Image Processing (ICIP), 2006: 141-144), including TF-IDF (Term Frequency-Inverse Document Frequency) text features and binary image duplicate features. In order to illustrate principles of the invention, detection techniques are illustratively described herein as being built on this baseline system.

Figure 2:
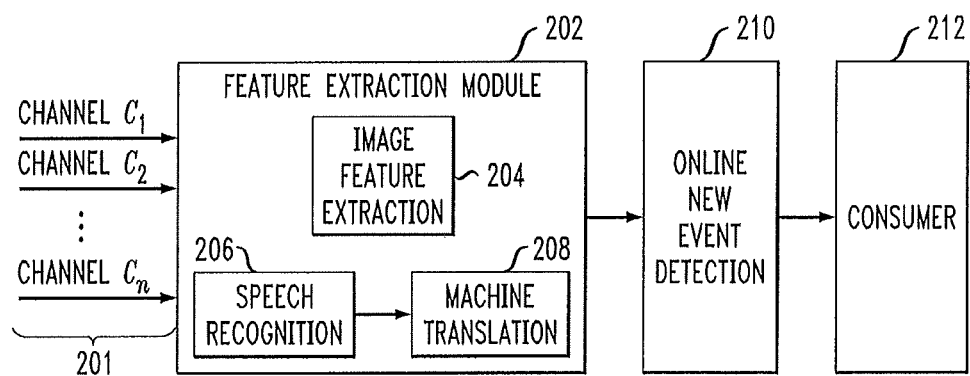
FIG. 2 illustrates an online new event detection system, according to an embodiment of the invention.

FIG. 2 shows the architecture of baseline ONED system 200, where video streams can come from, for example, one or more multi-lingual video channels 201 ($C_1, C_2, \ldots C_n$). These streams are then partitioned into "shots." The partitioning block is not expressly shown. Each shot is about several (e.g., three) seconds long and defined as a single continuous camera operation without an editor's cut, fade, or dissolve. For each shot, feature extraction module 202 both extracts image features (204) from its keyframe, and obtains the English text features by using automatic speech recognition (206) followed by machine translation (208), so that the original video clips in different languages become comparable. A "keyframe" is a complete (possibly compressed) image used as a reference for subsequent images in videos. Then ONED component 210 uses the text and image features to identify the new-event shots that present previously unseen events, and sends these shots to consumer 212, who can be either a person or a computer program that does, for example, deeper analysis. Note that although we use video shots as the basic NED unit in this illustrative embodiment, principles of the invention do not rely on this choice and thus they are universally applicable to other units such as a news story and so on.

The baseline system uses the traditional tf·idf term weights as the text features. Since each shot S is too short to contain enough text for computing meaningful text similarity (see below), we extend the text of S with both the texts of the previous m=5 shots and the texts of the next m shots (note that all of these shots come from the same channel). Following the convention of information retrieval, we define a term as a unique word and vocabulary as the set of all the unique words. For each term t in the vocabulary and a shot S in a shot set E, the baseline system uses the following formulas to compute the term weight:

term frequency (tf) weight $w=\ln(tf+1)$,  (f1)

inverse document frequency (idf) weight $w_{idf}=\ln[(N+1)/(df+0.5)]$,  (f2)

term (tf·idf) weight $w_t = w_{tf} \times w_{idf}$  (f3)

where tf is term t's frequency (i.e., number of occurrences) in the text of S, N is the total number of shots in E, and df is the number of shots in E whose texts contain t.

In practice, there are many different ways to extract image features that are (almost equally) suitable for detecting near-duplicate images. The baseline system uses the color moment feature described in Campbell et al. (M. Campbell, S. Ebadollahi, and D. Joshi et al., "IBM Research TRECVID-2006 Video Retrieval System," NIST TRECVID workshop, 2006), where the localized color statistics are extracted from a 3×3 grid of the keyframe image, and the first three moments for each grid in Lab color space are used to construct the n=81 image features $f_i$ ($1 \le i \le n$) of S. However, the invention is not limited to this particular technique.

By way of another example, IBM Corporations' Translingual Automatic Language Exploitation (TALES) system (R. Peterson, "IBM Strives for Super Human Speech," http://www.accessible-devices.com/superspeech.html, 2006) can use computer clusters to perform both image and text feature extraction on video streams from thousands of channels simultaneously with a delay of about four minutes—almost in real time.

Again, the above described image and text feature extraction techniques are merely examples of conventional techniques that can be used and, therefore, it is to be understood that other suitable techniques may be employed. It is to be understood that the focus of the principles of the invention is the ONED component (210) that existing systems cannot satisfactorily complete in real time.

To detect new-event shots in a video ONED system, we compute the dissimilarity between two shots $S_1$ and $S_2$ using their text and image features. The smaller the dissimilarity is, the more likely $S_1$ and $S_2$ are to present the same event. We show the dissimilarity computation method as follows. First, the text dissimilarity value is obtained using (f4) and (f5):

normalized text dot product value  (f4)

$$\text{text\_dotprod}_{S_1, S_2} = \sum_{t \in S_1, S_2} w_{t,1} \times w_{t,2} \Big/ \sqrt{\sum_{t \in S_1} w_{t,1}^2 \times \sum_{t \in S_2} w_{t,2}^2},$$

text dissimilarity value $\text{text\_dissim}_{S_1, S_2} = 1 - \text{text\_dotprod}_{S_1, S_2}$,  (f5)

where $w_{t,j}$ (j=1, 2) is the term weight for $S_j$. Notation t∈$S_j$ means that term t appears in the text of $S_j$. Next, we obtain the image dissimilarity value using (f6) and (f7):

normalized image dissimilarity value (f6)

$$\text{image\_dissim}_{S_1,S_2} = \sqrt{\sum_{i=1}^{n}(f_{i,1} - f_{i,2})^2/n},$$

binarized image dissimilarity value bin_image_dissim$_{S_1,S_2}$=$I_{\{image\_dissim_{S1,S2}>T_{image}\}}$, (f7)

where $f_{i,j}$ (j=1, 2) is the image feature for $S_j$, $T_{image}$ is a threshold for binarizing the image dissimilarity, and I is the indicator function. That is, the binarized image dissimilarity is one if the normalized image dissimilarity is larger than $T_{image}$, otherwise it is zero. Finally, the overall dissimilarity value of $S_1$ and $S_2$ is obtained as a linear combination of the text dissimilarity value and the binarized image dissimilarity value according to (f8):

overall_dissim$_{S_1,S_2}$=text—dissim$_{S_1,S_2}$+$w_{image}$×bin_image_dissim$_{S_1,S_2}$, (f8)

where $w_{image}$ is the linear weight for the visual modality. Such a linear fusion model is one of the most effective approaches to fuse visual and text modalities in video ONED systems.

We now present the details of the baseline system. We follow the typical pre-processing operations in information retrieval for the text of each shot, i.e., (1) stemming is performed using the standard Porter stemmer, and (2) stopwords are removed by using the standard SMART stopword list. "Stemming" is the process for reducing inflected (or sometimes derived) words to their stem, base or root form—generally a written word form. "Stopword" is the name given to a word which is filtered out prior to, or after, processing of text.

Note that, the shot set E keeps changing as new shots continue to arrive in a video streaming environment. For ONED purposes, the computation of the tf and idf weights can be based on a static shot set E' that has characteristics similar to E. For a term that does not exist in the text of E', its df is assumed as one. Compared to the method that incrementally updates the statistics N and df, this static method has a much lower overhead, while the detection accuracy remains roughly the same.

When a shot S arrives, S is first pre-processed and its features are saved in memory. Then S is compared with all the old shots that arrived in the past except for the L=50 shots that just arrived from the same channel before S, as those L shots are likely to be in the same news story segment as S. If all the overall dissimilarity values between S and the old shots are above a threshold T, S is predicted to be a new-event shot. Otherwise if the overall dissimilarity value between S and an old shot $S_{old}$ is below T, S is predicted to present the same event as $S_{old}$.

It can be shown that although text features are the most effective component in detecting new events, visual near-duplicates can still consistently enhance the detection accuracy of the text baseline. To be more specific, using both text and image features can improve the detection accuracy of the text baseline by up to 25%. This can be explained by the fact that similar images in two shots often provide evidence that they present the same event, even if their associated speech transcript may not be sufficiently similar due to paraphrasing or speech recognition/translation errors. That is, text features by themselves cannot correctly detect that these two shots are presenting the same event. However, by considering the additional evidence from image features, the system can produce the correct predictions.

To provide more insight on the overall dissimilarity value, we rewrite the original dissimilarity formula (f8) into an equivalent form that treats text and image features asymmetrically. We further analyze this alternative form to show how the NED process can be more efficient. To begin, we substitute the formulas (f5) and (f7) into (f8) and rewrite the overall dissimilarity of $S_1$ and $S_2$ to be overall_dissim$_{S_1,S_2}$=1−text_dotprod$_{S_1,S_2}$+$w_{image}$× $I_{\{image\_dissim_{S1,S2}>T_{image}\}}$, (f9)

We analyze (f9) by considering two possible cases, while either case has two sub-cases:

(1) When the keyframes of $S_1$ and $S_2$ are near-duplicate images, i.e., image_dissim$_{S_1,S_2}$≤$T_{image}$, we have overall_dissim$_{S_1,S_2}$=1−text_dotprod$_{S_1,S_2}$. Thus, we can predict that:
   (i) Sub-case 1: $S_1$ and $S_2$ present the same event if 1−T<text_dotprod$_{S_1,S_2}$, and
   (ii) Sub-case 2: $S_1$ and $S_2$ present different events if 1−T≥text_dotprod$_{S_1,S_2}$.

(2) When the keyframes of $S_1$ and $S_2$ are not near-duplicate images, i.e., image_dissim$_{S_1,S_2}$>$T_{image}$, we have overall—dissim$_{S_1,S_2}$=1−text_dotprod$_{S_1,S_2}$+$w_{image}$.
Thus, we can predict that:
   (i) Sub-case 3: $S_1$ and $S_2$ present the same event if 1+$w_{image}$−T<text_dotprod$_{S_1,S_2}$, and
   (ii) Sub-case 4: $S_1$ and $S_2$ present different events if 1+$w_{image}$−T≥text_dotprod$_{S_1,S_2}$.

Figure 3:
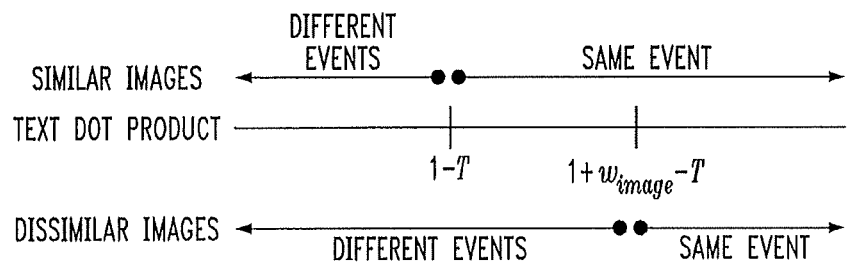
FIG. 3 illustrates various video stream similarity scenarios, according to an embodiment of the invention.

FIG. 3 illustrates the above four sub-cases.

For any two shots $S_1$ and $S_2$, it seems that one must use both their text/image features and check all of the above four sub-cases to determine whether they present the same event. However, this turns out to be unnecessary in many cases. By treating text and image asymmetrically, we can greatly simplify the NED operation by rewriting the above four sub-cases into the following equivalent three cases, among which only Case 2 has two sub-cases:

(1) Case 1: 1−T≥text_dotprod$_{S_1,S_2}$. In this case, we predict that $S_1$ and $S_2$ present different events, irrespective of the normalized image dissimilarity image_dissim$_{S_1,S_2}$.

(2) Case 2: 1−T<text_dotprod$_{S_1,S_2}$≤1+$w_{image}$−T. In this case, there are two sub-cases:
   (i) Sub-case 1: If image_dissim$_{S_1,S_2}$≤$T_{image}$, we predict that $S_1$ and $S_2$ present the same event.
   (ii) Sub-case 2: If image_dissim$_{S_1,S_2}$>$T_{image}$, we predict that $S_1$ and $S_2$ present different events.

(3) Case 3: 1+$w_{image}$−T<text_dotprod$_{S_1,S_2}$. In this case, we predict that $S_1$ and $S_2$ present the same event, irrespective of the normalized image dissimilarity image_dissim$_{S_1,S_2}$.

In the above cases, both Case 1 and Case 3 only require the text features of shots $S_1$ and $S_2$. Hence, for ONED purpose, text features and image features can be treated asymmetrically, i.e., we can use text features as a pre-filter to filter out most of the unnecessary operations on image features. This can bring a huge benefit to the detection efficiency, because the text similarities of most shot pairs are low, and hence Case 1 is the most frequently occurring case. On the other hand, it is undesirable to process image features before text features because using image features alone cannot determine whether $S_1$ and $S_2$ present the same event.

We now describe illustrative techniques for improving the efficiency of the ONED system based on the above analysis. We first give a high-level overview of our optimized ONED system, and then elaborate on the individual techniques.

Figure 4:
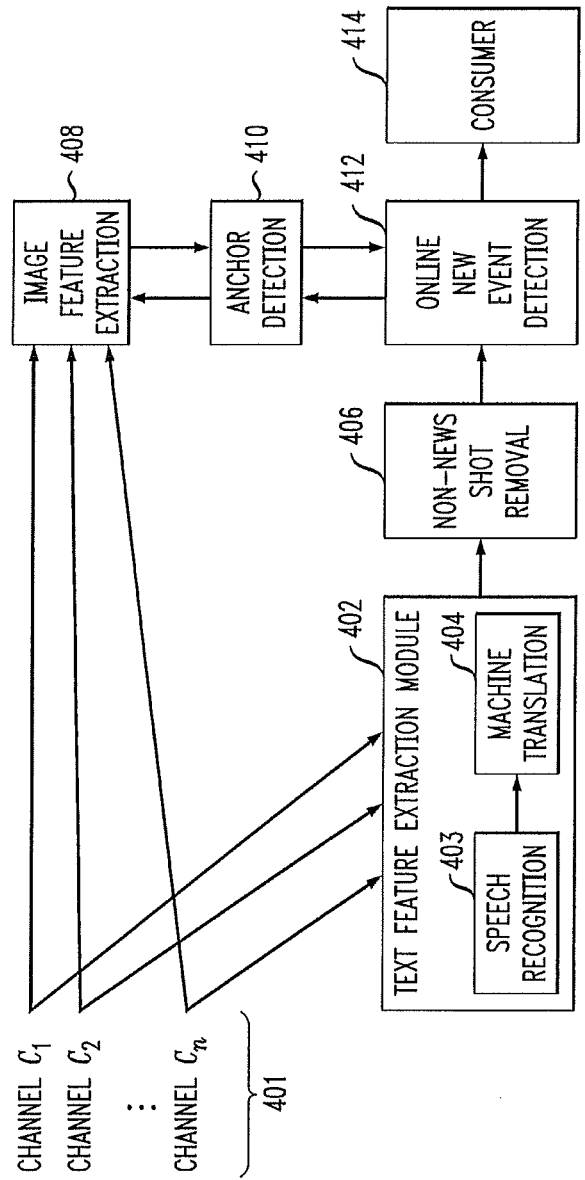
FIG. 4 illustrates an online new event detection system, according to another embodiment of the invention.

FIG. 4 shows the architecture of optimized ONED system 400, according to an illustrative embodiment. Video streams from one or more channels 401 ($C_1, C_2, \ldots C_n$) are divided into shots (not expressly shown). For each shot S, the text features are extracted (402) by using speech recognition (403) as well as machine translation (404) techniques. The text features are used to identify and remove the non-news shots (406). The remaining news shots are fed to ONED component 412, where new-event shots are identified and sent to consumer (414). During the ONED process, we extract the image features (408) of S only when it is necessary to determine whether the keyframe of S is an anchor image (410) and to compute the image similarities between S and the old shots.

FIG. 5 shows a description of the algorithm used in accordance with ONED system 400. The details of this algorithm are explained below. One of ordinary skill in the art will easily realize which portions of pseudocode in algorithm 500 relate to the steps performed by the ONED component.

In broadcast videos, non-news video segments (e.g., commercials, TV shows) are usually mixed with news stories. For ONED purposes, non-news shots should not be treated as new-event shots, even if no similar shots have appeared before. Removing these shots can not only reduce the number of shots that need to be processed by the ONED component, but also improve the efficiency and the detection accuracy of the ONED system.

To this end, a simple method is to manually specify the regular time periods when news videos are broadcasted. However, such a method is not scalable to tens of thousands of channels, as is the typical case that an ONED system needs to handle. Moreover, it is preferable for our purposes to remove all the non-news shots rather than commercials only. As an alternative, we apply a simple text-based method to remove the non-news shots. Its basic idea is that non-news shots (e.g., commercials) often have larger background noise than news shots, which makes it difficult for the speech recognizer to recognize the text in the non-news video. Also, in news shots the anchor person tends to talk at a faster pace than non-news shots (e.g., TV shows). Based on these two properties, we predict that a shot S is not news if the recognized text of S contains fewer than J distinct terms where J is a predetermined constant. Although this method is rather simple, it is highly accurate and has a low overhead that helps to improve the efficiency of the ONED system. Also, the expensive image feature extraction step is no longer needed for the dropped non-news shots.

As mentioned above, it is desirable to delay the processing of image features as much as possible. As shown in FIGS. 4 and 5, when processing a new shot S, we first extract its text features but not its image features. When comparing S with an old shot $S_{old}$, we first compute their normalized text dot product instead of their image dissimilarity. If $1-T \geq \text{text\_dotprod}_{S,S_{old}}$ (Case 1 above), we predict that S and $S_{old}$ present different events. If $1+w_{image}-T<\text{text\_dotprod}_{S,S_{old}}$ (Case 3 above), we predict that S and $S_{old}$ present the same event. In both Case 1 and Case 3, we skip the costly but unnecessary image dissimilarity computation step. Only in Case 2 (when $1-T<\text{text\_dotprod}_{S,S_{old}} \leq 1+w_{image}-T$), we need to compute the image dissimilarity. Since the text dot products of most pairs of shots are low, Case 2 usually occurs much less frequently than Case 1 and Case 3. Consequently, most image dissimilarity computations can be saved.

Moreover, when we make the prediction that a new shot is not a new event, if all the compared old shots belong to either Case 1 or Case 3, we can skip the expensive image feature extraction step. In other words, we only need to extract image features for a new shot S when either we predict that S is a new-event shot or we have $1-T<\text{text\_dotprod}_{S,S_{old}} \leq 1+w_{image}-T$ for some $S_{old}$. In practice, in the presence of a large number$_{age}$ of channels, most shots will be presenting existing events due to the repeated mention of the same event both across different channels and within the same channel. Also, Case 1 and Case 3 occur much more frequently than Case 2. Thus, we can skip the expensive image feature extraction step for a large fraction of the shots.

In news videos, news stories are typically broadcasted by anchor persons. Two news shots from the same channel often have keyframes with the same anchor person, but present different events. However, in this case, the similar keyframes should not be treated as a hint that these two shots present the same event. To take this factor into account, we use the following method. The anchor image detection method described in Campbell et al. (M. Campbell, S. Ebadollahi, and D. Joshi et al., "IBM Research TRECVID-2006 Video Retrieval System," NIST TRECVID workshop, 2006) is used to detect which keyframes are anchor images. In such known anchor image detection method, a determination is made as to which keyframes are anchor images based on Support Vector Machines (SVM) and low-level color correlogram features. Other known anchor image detection methods can be employed. Then, when comparing two shots, we set the binarized image dissimilarity to be one if the keyframe of either shot is an anchor image. That is to say, we treat their keyframes to be dissimilar if either of them is an anchor shot. This can reduce the effect of the false evidence of anchor shots on the detection accuracy of the ONED system.

Typically, the discussion of an event only lasts for a finite amount of time in news videos, and a new shot is unlikely to present the same event as a shot that is fairly old. Hence, we only keep in memory the information of those old shots that are within a sliding window such as the last W days. Here W is a predetermined constant. The information kept for a shot S includes both its text features and its image features (see above) but not its video images, as only these features are needed for comparing S with future shots. Once an old shot expires from the sliding window, its information is thrown away immediately. As shown, FIG. 6C illustrates a sliding time window, according to an embodiment of the invention.

Typically, an event is presented by a large number of shots. Only one of these shots is the new-event shot. All the shots that present the same event tend to be similar to each other. Therefore, it is overkill to compare a new shot with all the old shots that present the same event. Instead, we only keep the information of the new-event shots. When a new shot S arrives, S is compared with the old new-event shots. If S is predicted to be a new-event shot that presents a new event, S's information is saved in memory. Otherwise S is discarded.

All the terms in the text of a shot can be sorted in descending order of their term weights. In general, those terms with larger weights are more important for NED. Hence, for each saved shot, we keep only the top-K terms with the largest weights rather than all the terms. Here K is a predetermined constant. Only the top-K terms are used to compute the text dot product.

To reduce the overhead of computing dissimilarity values, a pre-filtering technique is developed by using a low-overhead method to quickly filter out most of the shots that present different events from the new shot. In this way, we can substantially reduce the number of dissimilarity values that need to be computed. Consider two shots $S_1$ and $S_2$. If $S_1$ and $S_2$ present the same event, the top terms of their texts tend to have some overlap. That is, some term(s) is likely to appear in the top terms of both $S_1$'s text and $S_2$'s text. Thus, these top terms can be used to quickly filter out unnecessary computations. More specifically, we have a predetermined constant M (M≤K). Before computing the text dot product of $S_1$ and $S_2$, we first check whether the top-M terms of $S_1$ and $S_2$ intersect. If so, we continue to compute the text dot product of $S_1$ and $S_2$. Otherwise, we predict that $S_1$ and $S_2$ present different events and do not compute their text dot product.

We build indices to avoid unnecessary processing of the shots that have been pre-filtered out. Each term in the vocabulary has a term id. Each shot has a shot id corresponding to its arrival time. Two indices are kept for all the saved shots: a forward index and an inverted index. The forward index has an entry for each saved shot. These entries are sorted in descending order of shots' arrival time. This allows us to quickly identify and drop the information of those shots that have expired from the sliding window of the last W days (see above). For each saved shot, the corresponding entry keeps both the image features and the top-K terms associated with their term weights. These terms are sorted in ascending order of their term ids. Consequently, the text dot product of two shots can be computed through an efficient "merge" of their term lists.

For each saved shot, only its top-M terms are tracked by the inverted index. The inverted index has an entry for each term in the vocabulary. The entry for term t is a posting (linked) list of the shot ids of all the shots whose top-M terms contain t. These shot ids are sorted in descending order so that merging posting lists can be done efficiently. When a new shot S arrives, we only scan the M posting lists that correspond to S's top-M terms. These M posting lists are merged together to find the shot ids of the candidate shots that may present the same event as S. This is the pre-filtering technique described above. Then for each such candidate shot $S_c$, the forward index is used to compute the text dot product and the image dissimilarity (if needed) of S and $S_c$. This computation is performed at the same time that candidate shot ids are generated. In this way, if the overall dissimilarity value of S and an old shot is smaller than the threshold T, S is predicted to be a non-new-event shot and the processing for S stops immediately. Otherwise if S is predicted to be a new-event shot, S's information can be easily added into the inverted index, as S's shot id is larger than the shot ids of the saved shots.

Figure 6A:
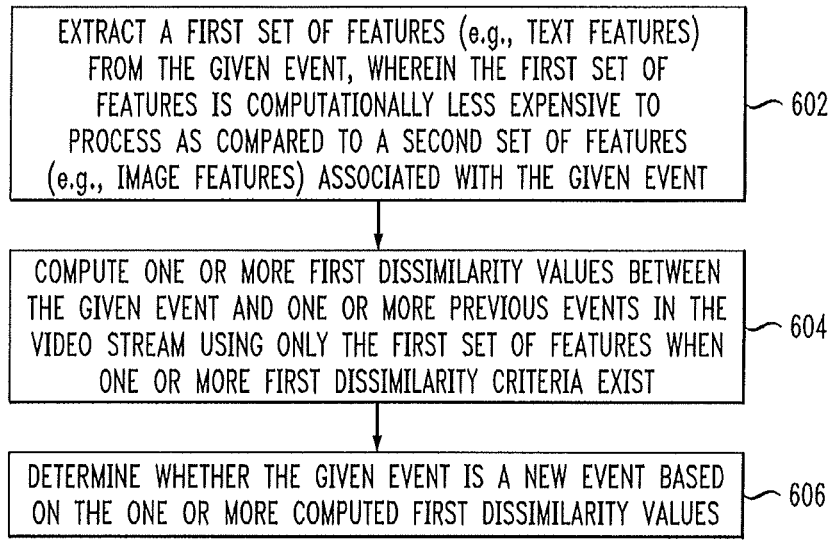
FIG. 6A illustrates an online new event detection methodology, according to another embodiment of the invention.

FIG. 6A illustrates an online new event detection methodology, according to another embodiment of the invention. This method may be implemented in ONED system 400. As shown, method 600 determines whether a given event is a new event in a video stream. The video stream includes a plurality of events. Step 602 extracts a first set of features (e.g., text features) from the given event. The first set of features is computationally less expensive to process as compared to a second set of features (e.g., image features) associated with the given event. Step 604 computes one or more first dissimilarity values between the given event and one or more previous events in the video stream using only the first set of features when one or more first dissimilarity criteria exist. Step 606 determines whether the given event is a new event based on the one or more computed first dissimilarity values.

Figure 6B:
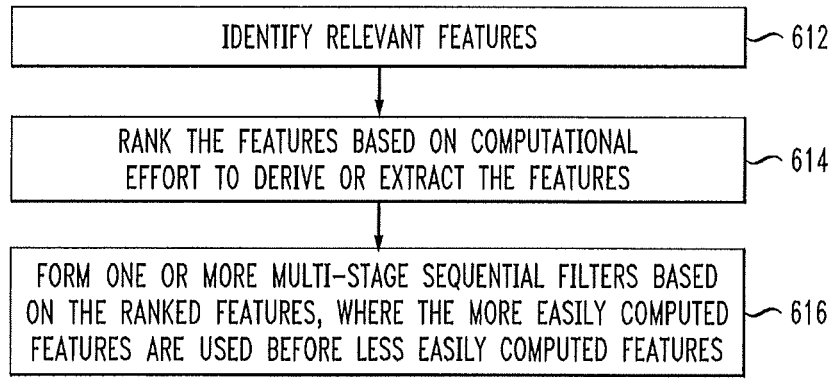
FIG. 6B illustrates an online new event detection methodology, according to yet another embodiment of the invention.
Figure 6C:
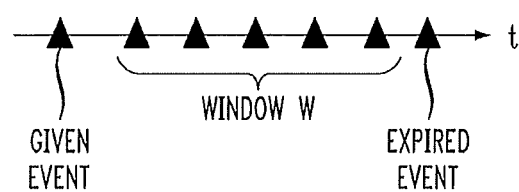
FIG. 6C illustrates a sliding time window, according to an embodiment of the invention.

FIG. 6B illustrates an online new event detection methodology, according to yet another embodiment of the invention. This method may be implemented in ONED system 400. As shown, method 610 is a real-time new event detection process for capturing new-event video clips that present previously unseen events in a video streaming environment. The method includes a multi-stage sequential filtering process. The process includes identifying relevant features (step 612), ranking the features based on computational effort to derive or extract the features (step 614), and forming one or more multi-stage sequential filters based on the ranked features, where the more easily computed features are used before less easily computed features (step 616). In one particular embodiment, one stage of the multi-stage sequential filtering process is the use of text features alone as a filter to detect a new event, while a subsequent stage is the use of image features as a filter to supplement the detection process.

Figure 7:
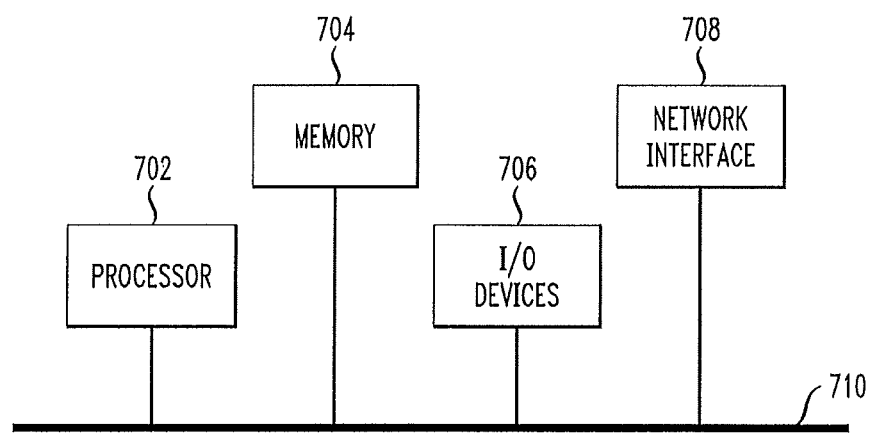
FIG. 7 illustrates a computer system wherein techniques for online new event detection may be implemented, according to an embodiment of the invention.

Referring lastly to FIG. 7, a computer system is illustrated wherein techniques for online new event detection may be implemented according to an embodiment of the invention. That is, FIG. 7 illustrates a computer system in accordance with which one or more components/steps of the ONED techniques (e.g., components and methodologies described above in the context of FIGS. 1 through 6B) may be implemented, according to an embodiment of the invention. It is to be understood that the individual components/steps may be implemented on one such computer system or on more than one such computer system. In the case of an implementation on a distributed computing system, the individual computer systems and/or devices may be connected via a suitable network, e.g., the Internet or World Wide Web. However, the system may be realized via private or local networks. In any case, the invention is not limited to any particular network.

Thus, the computer system shown in FIG. 7 may represent one or more servers or one or more other processing devices capable of providing all or portions of the functions described herein. For example, FIG. 7 represents a computer architecture for implementing the components of the ONED systems of FIG. 2 or FIG. 4.

As shown, computer system 700 includes processor 702, memory 704, input/output (I/O) devices 706, and network interface 708, coupled via a computer bus 710 or alternate connection arrangement.

It is to be appreciated that the term "processor" as used herein is intended to include any processing device, such as, for example, one that includes a CPU and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. The memory may be considered a computer readable storage medium.

In addition, the phrase "input/output devices" or "I/O devices" as used herein is intended to include, for example, one or more input devices (e.g., keyboard, mouse, etc.) for entering data to the processing unit, and/or one or more output devices (e.g., display, etc.) for presenting results associated with the processing unit.

Still further, the phrase "network interface" as used herein is intended to include, for example, one or more transceivers to permit the computer system to communicate with another computer system via an appropriate communications protocol.

Accordingly, software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

In any case, it is to be appreciated that the techniques of the invention, described herein and shown in the appended figures, may be implemented in various forms of hardware, software, or combinations thereof, e.g., one or more operatively programmed general purpose digital computers with associated memory, implementation-specific integrated circuit(s), functional circuitry, etc. Given the techniques of the invention provided herein, one of ordinary skill in the art will be able to contemplate other implementations of the techniques of the invention.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of real-time new event detection to capture new-event video clips that present previously unseen events in a video streaming environment, the method comprising the step of providing a multi-stage sequential filtering process, the process comprising steps of:
   identifying relevant features;
   ranking the features based on computational effort to derive or extract the features; and
   forming one or more multi-stage sequential filters based on the ranked features, where more easily computed features are used before less easily computed features, and the multi-stage sequential filters are used to identify the captured new-event video clips in the video streaming environment;
   wherein text features alone are used to filter out a majority of non-new-event clips, so that image feature extraction on these clips is avoided; and
   wherein the steps are performed by at least one processor device coupled to a memory.

2. The method of claim 1, wherein one or more indices are built to increase processing speed.

3. The method of claim 1, wherein only information about the identified captured new-event video clips within the last W days is stored in memory.

4. The method of claim 1, wherein only information about top-K most important terms for each clip is stored in memory.

5. The method of claim 1, wherein top-M most important terms in the clips are used to pre-filter out old clips that are unlikely to present the same event as the new clip.

6. A method of real-time new event detection to capture new-event video clips that present previously unseen events in a video streaming environment, the method comprising the step of providing a multi-stage sequential filtering process, the process comprising steps of:
   identifying relevant features;
   ranking the features based on computational effort to derive or extract the features; and
   forming one or more multi-stage sequential filters based on the ranked features, where more easily computed features are used before less easily computed features, and the multi-stage sequential filters are used to identify the captured new-event video clips in the video streaming environment;
   wherein when comparing the new clip with an old clip, their text similarity is computed first and an image similarity computation is skipped if their texts are sufficiently dissimilar; and
   wherein the steps are performed by at least one processor device coupled to a memory.

7. An article of manufacture for determining whether a given event is a new event in a video stream comprising a plurality of events, the article comprising a non-transitory computer readable storage medium including one or more programs which when executed by a computer perform steps of:
   identifying relevant features;
   ranking the features based on computational effort to derive or extract the features; and
   forming one or more multi-stage sequential filters based on the ranked features, where more easily computed features are used before less easily computed features, and the multi-stage sequential filters are used to identify the captured new-event video clips in the video streaming environment;
   wherein text features alone are used to filter out a majority of non-new-event clips, so that image feature extraction on these clips is avoided.

8. The article of claim 7, wherein one or more indices are built to increase processing speed.

9. The article of claim 7, wherein only information about the identified captured new-event video clips within the last W days is stored in memory.

10. The article of claim 7, wherein only information about top-K most important terms for each clip is stored in memory.

11. The article of claim 7, wherein top-M most important terms in the clips are used to pre-filter out old clips that are unlikely to present the same event as the new clip.

12. An article of manufacture for determining whether a given event is a new event in a video stream comprising a plurality of events, the article comprising a non-transitory computer readable storage medium including one or more programs which when executed by a computer perform steps of:
   identifying relevant features;
   ranking the features based on computational effort to derive or extract the features; and
   forming one or more multi-stage sequential filters based on the ranked features, where more easily computed features are used before less easily computed features, and the multi-stage sequential filters are used to identify the captured new-event video clips in the video streaming environment;
   wherein when comparing the new clip with an old clip, their text similarity is computed first and an image similarity computation is skipped if their texts are sufficiently dissimilar.

13. An apparatus for determining whether a given event is a new event in a video stream comprising a plurality of events, the apparatus comprising:
   a memory; and
   at least one processor coupled to the memory and operative to:
   identify relevant features;
   rank the features based on computational effort to derive or extract the features; and
   form one or more multi-stage sequential filters based on the ranked features, where more easily computed features are used before less easily computed features, and the multi-stage sequential filters are used to identify the captured new-event video clips in the video streaming environment;
   wherein text features alone are used to filter out a majority of non-new-event clips, so that image feature extraction on these clips is avoided.

14. The apparatus of claim 13, wherein one or more indices are built to increase processing speed.

15. The apparatus of claim 13, wherein only information about the identified captured new-event video clips within the last W days is stored in memory.

16. The apparatus of claim 13, wherein only information about top-K most important terms for each clip is stored in memory.

17. The apparatus of claim 13, wherein top-M most important terms in the clips are used to pre-filter out old clips that are unlikely to present the same event as the new clip.

* * * * *